United States Patent [19]

Ernst et al.

[11] 4,109,978
[45] Aug. 29, 1978

[54] ELECTRICALLY INSULATED SLEEVE BEARING AND METHOD OF MAKING SAME

[75] Inventors: Richard G. Ernst, Anoka; Charles W. Medved, Minneapolis, both of Minn.

[73] Assignee: Electric Machinery Mfg. Co., Minneapolis, Minn.

[21] Appl. No.: 732,506

[22] Filed: Oct. 14, 1976

[51] Int. Cl.² .................................................. F16C 33/04
[52] U.S. Cl. ......................... 308/237 R; 29/149.5 NM; 156/86; 308/DIG. 8
[58] Field of Search ............... 308/237 R, 237 A, 238, 308/DIG. 8, DIG. 7, 240, 241; 29/149.5 NM; 156/86, 188

[56] References Cited
U.S. PATENT DOCUMENTS

| 3,491,799 | 1/1970 | Foll | 156/86 X |
| 3,514,831 | 6/1970 | Bruch et al. | 29/149.5 NM |
| 3,574,429 | 4/1971 | Reising | 308/238 |
| 3,582,166 | 6/1971 | Reising | 308/238 |
| 3,848,332 | 11/1974 | Bergquist, Jr. | 156/86 X |

Primary Examiner—Trygve M. Blix
Assistant Examiner—Douglas C. Butler
Attorney, Agent, or Firm—Merchant, Gould, Smith, Edell, Welter & Schmidt

[57] ABSTRACT

An electrically insulated bearing and method of making the bearing. In the preferred embodiment the bearing is a sleeve bearing having a tubular member with a machined inner wear surface for supporting the shaft of rotating electrical machinery. The as-cast outer surface of the tubular member is wrapped with an epoxy resin-impregnated fibrous material and covered with a heat-shrinkable tape. The bearing is then subjected to a heat curing cycle. The hardened resin-impregnated fibrous layer is then machined to form the bearing seat and thrust faces.

9 Claims, 4 Drawing Figures

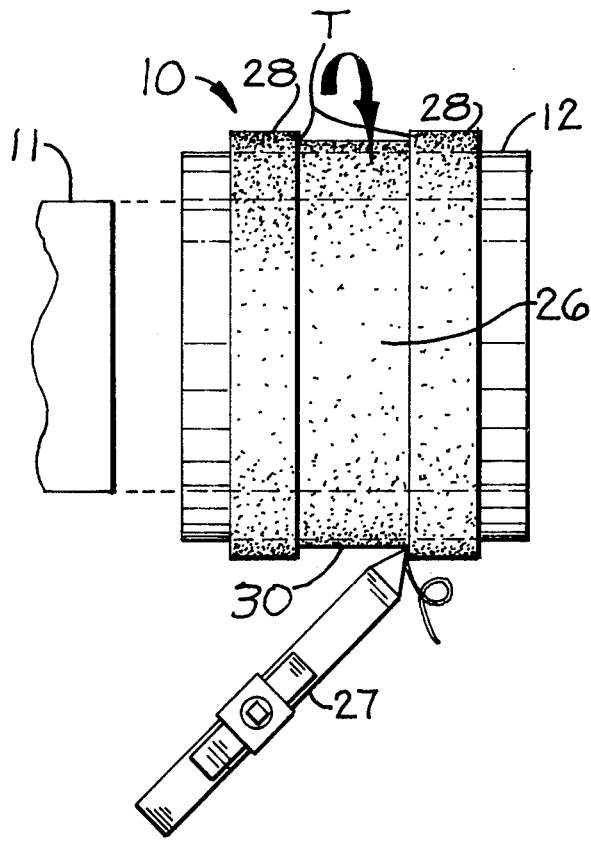

ELECTRICALLY INSULATED SLEEVE BEARING AND METHOD OF MAKING SAME

BACKGROUND OF THE INVENTION

This invention relates broadly to electrically insulated bearings and a method for manufacturing the insulated bearings. More particularly, the invention relates to methods for manufacturing insulated sleeve bearings utilized in large rotating electrical machinery.

Sleeve bearings are typically utilized to secure the shafts of large rotating electrical machines and generators. The prior art sleeve bearings generally have a machined inner surface covered with a material to provide a wear surface for the rotating shaft. The outer surface of the bearing is also usually machined. A tube of insulating material having a machined inner surface is then placed about the bearing sleeve with its inner machined surface cemented to the machined exterior surface of the sleeve.

The prior art also includes sleeve bearings having an insulating layer which is applied by spraying an alumina oxide plasma coating onto the exterior surface of the sleeve. Such procedures are complex and require precise controls to insure uniformity in the deposited layer. In addition, such coatings cannot be effectively applied to an as-cast bearing surface.

The requirement in the prior art insulated sleeve bearings that the exterior surface of the metal sleeve be machined is both time-consuming and costly. The present invention eliminates the disadvantages of the prior art insulated sleeve bearings in that it is a sleeve bearing having a metal sleeve member with an as-cast or non-machined outer surface to which is applied an electrically insulating layer. In addition to eliminating the step of machining the exterior surface of the bearing sleeve, there is also no requirement that the mating surface of the insulating layer be precisely machined to fit the bearing sleeve.

SUMMARY OF THE INVENTION

The present invention is an insulated bearing having bearing wear surface and support members and a method for making the bearing in which an electrical insulating layer of resin-impregnated fibrous material is wrapped about the surface of at least one of the wear surface or support members and subjected to a heat curing cycle.

In the preferred embodiment, the electrical insulating layer is a fibrous material, typically felt, which is impregnated with epoxy resin and applied to the outer as-cast surface of a sleeve bearing. The resin-impregnated fibrous material is covered with a heat-shrinkable layer and the bearing is then subjected to a heat curing cycle. The epoxy resin hardens and the heat-shrinkable layer, which in one embodiment may be heat-shrinkable tape, shrinks compressing the insulating layer about the tubular bearing member.

The hardened resin insulating layer adheres to the exterior as-cast surface of the sleeve bearing and is machined to define a bearing seat and bearing thrust faces. In its final configuration, the hardened insulating layer has end members each with a diameter greater than the diameter of an intermediate connecting member. The surface of the intermediate connecting member serves as the bearing seat while the bearing thrust faces are defined at the juncture of the end members with the intermediate connecting member.

In the preferred embodiment, the exterior as-cast surface of the sleeve bearing may simply be cleaned prior to application of the epoxy resin-impregnated fibrous material. In an alternative embodiment, the exterior surface of the tubular member may be machined to a rough finish prior to the application of the insulating layer.

Thus, the present invention provides the advantage of eliminating costly and time-consuming machine operations in manufacturing electrically insulated sleeve bearings in that an electrical insulating layer is applied directly to the as-cast outer surface of the sleeve bearing. This and other advantages of our invention will become apparent with reference to the drawings, description of the preferred embodiment, and claims.

DESCRIPTION OF THE PREFERRED EMBODIMENT

The invention will be described and is illustrated in FIGS. 1-4 with reference to a sleeve bearing. It is to be understood, however, that the application of an electrically insulating layer of resin-impregnated fibrous material which is subsequently heat cured to other bearing structures, to include the bearing housing, brackets, bearing rings and to roller or ball bearings is within the scope of our invention. The resin-impregnated fibrous insulating layer may be utilized on any bearing surface to insulate against currents induced in the shafts of rotating electrical machines.

Figure 1:
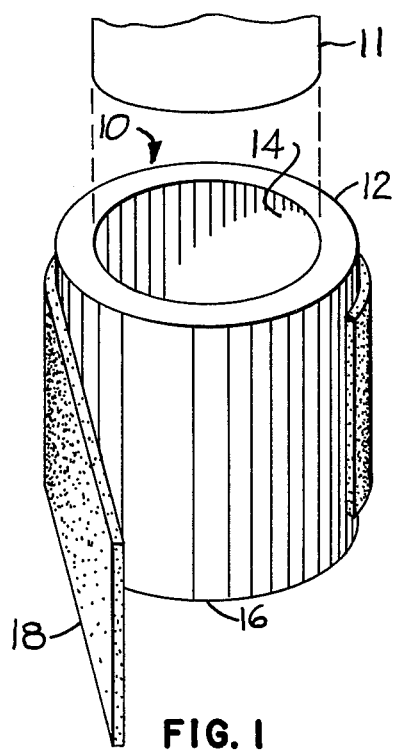
FIG. 1 is a view in perspective illustrating the first step in applying the electrical insulating layer to the sleeve bearing.
Figure 4:
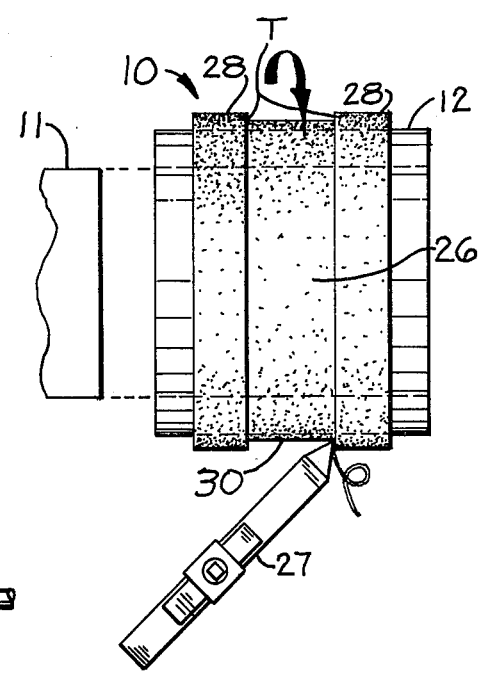
FIG. 4 is a side elevation of the bearing illustrating the machining of the exterior surface of the hardened insulating layer to form the finished bearing.

Referring to the drawing wherein like numerals represent like parts throughout the several views, there is shown a sleeve bearing designated generally at 10. Sleeve bearing 10 includes a tubular member 12 having an inner surface 14 and an outer surface 16. Surface 14 is typically machined and covered with a suitable material to provide a smooth wear surface for a rotating shaft 11 of a large electrical machine (not shown). For the purpose of illustration the relationship of shaft 11 to bearing 10 is shown in FIG. 1 and FIG. 4 only. Surface 16 may also be machined to a rough finish, however, in the preferred embodiment surface 16 remains as-cast or non-machined.

FIG. 1 illustrates an electrical insulating layer 18 being wrapped about surface 16. Prior to the step shown in FIG. 1, the bearing surface 16 is cleaned to remove material which may inhibit the adherance of layer 18 to surface 16. Layer 18 may be any fibrous material, typically felt, and is impregnated with an epoxy resin. The drawings illustrate a single circumferential wrapping of surface 16, however, layer 18 may be wrapped about surface 16 as many times as desired to achieve a particular thickness.

Figure 2:
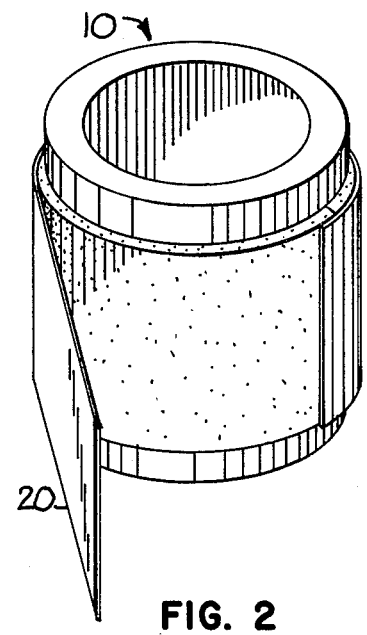
FIG. 2 is a view in perspective illustrating the step of applying a heat-shrinkable material about the insulating layer.

After layer 18 has been wrapped about surface 16 a heat-shrinkable material is applied to cover layer 18. As shown in FIG. 2, the heat-shrinkable material may be a tape 20 that is simply wrapped about layer 18. It is also contemplated that a heat-shrinkable tube could be utilized instead of tape 20.

Figure 3:
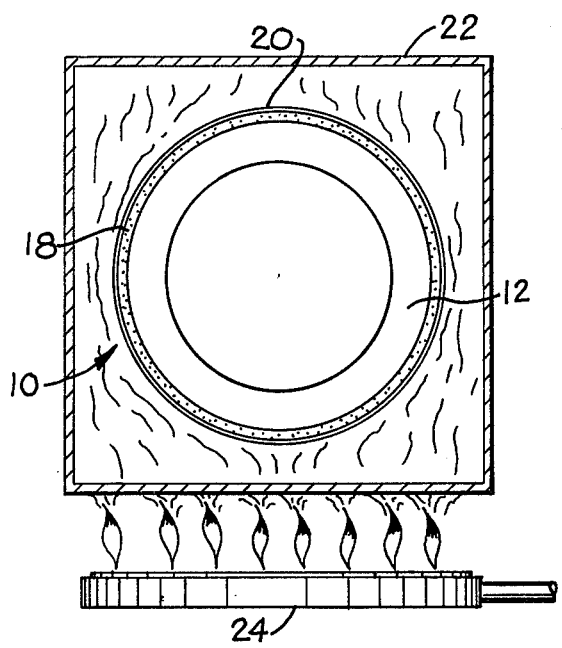
FIG. 3 is an end elevation illustrating the wrapped sleeve bearing undergoing a heat curing cycle.

Tubular member 12 with layer 18 and tape 20 is then subjected to a heat curing cycle as shown in FIG. 3. FIG. 3 illustrates bearing 10 in a heat chamber 22 with heat applied by a burner 24. It is understood that the apparatus shown in FIG. 3 is only illustrative of one possible arrangement for heat curing the bearing 10 and other apparatus is within the scope of the present invention.

During the heat cure cycle the epoxy resin hardens as tape 20 shrinks compressing layer 18. Thus a hardened electrical insulating layer is applied to tubular member 12. The hardened layer adheres to surface 16 masking any roughness in the as-cast or rough finish bearing surface, eliminating the need for machining either surface 16 or the mating surface of insulating layer 18. In one embodiment, the heat curing cycle is conducted for three hours at a temperature of 300° F. The time and temperature of the heat cure cycle may vary depending upon the particular epoxy resin selected.

As a final step in the process, the exterior surface 26 of insulating layer 18 is machined as illustrated in FIG. 4 by a cutting tool 27. Insulating layer 18 after the machining operation has annular end members 28 each with an outside diameter greater than the outside diameter of an integral connecting member 30. Member 30 provides a bearing seat while bearing thrust faces are defined at the juncture of end members 28 and connecting member 30, as shown at T.

The finished bearing, therefore, has a machined insulating layer applied to the as-cast exterior surface of a metal annular sleeve member. Costly and time-consuming machining steps are eliminated in the manufacture of the insulated sleeve bearing.

We claim:

1. A method of applying an electrical insulating layer to a tubular bearing having a machined inner surface and an as-cast outer surface comprising the steps of:
   wrapping said as-cast outer surface with an epoxy resin-impregnated fibrous material; and
   subjecting the wrapped tubular bearing to a heat curing cycle.

2. A method in accordance with claim 1 further comprising the step of applying a heat-shrinkable covering about said resin-impregnated material prior to said heat curing cycle.

3. A method in accordance with claim 2 wherein the step of applying a heat-shrinkable covering further comprises the step of wrapping heat-shrinkable tape about said resin-impregnated fibrous material.

4. A method in accordance with claim 1 further comprising the step of cleaning said as-cast outer surface of said tubular bearing prior to wrapping said bearing with said resin-impregnated fibrous material.

5. A method in accordance with claim 1 wherein said heat curing cycle comprises the step of subjecting said bearing member to 300° F.

6. A method in accordance with claim 5 further comprising the step of machining the outer surface of said heat-cured resin-impregnated insulating layer to form a bearing seat and bearing thrust surfaces.

7. An electrically insulated sleeve bearing for a rotating shaft of a large electrical machine comprising:
   (a) a tubular metal member having a machined inner surface providing a wear surface for the rotating shaft and an as-cast outer surface; and
   (b) an electrical insulating layer wrapped about said as-cast outer surface and adhered to, said insulating layer comprising an epoxy resin-impregnated fibrous material subjected to a heat curing cycle.

8. An electrically insulated sleeve bearing in accordance with claim 7 wherein said resin-impregnated fibrous material is covered by a heat-shrinkable layer prior to said heat curing cycle.

9. In a large rotating electrical machine having a rotating shaft, an electrically insulated sleeve bearing comprising:
   (a) a tubular metal member having a machined inner surface providing a wear surface for the rotating shaft and an as-cast outer surface; and
   (b) an electrical insulating layer adhered to said as-cast outer surface, said insulating layer having a first portion with a substantially cylindrical outer surface and a first outside diameter, annular first and second end members formed integral with said first portion and having second outside diameters greater than said first outside diameter, said substantially cylindrical surface of said first portion defining a bearing seat, said annular members defining bearing thrust faces at the juncture of said first portion with said end members.

* * * * *